Figure 1:
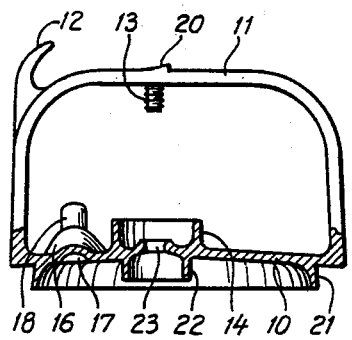

Nov. 26, 1963   SVEN-ÅKE NORDEGREN   3,111,933
OPERATING COVER FOR THE MILK PAIL OF A MILKING MACHINE
Filed Jan. 15, 1962

INVENTOR.
Sven-Åke Nordegren
BY
Davis, Hoxie, Faithfull & Hapgood
Attorneys

United States Patent Office 3,111,933
Patented Nov. 26, 1963

3,111,933
OPERATING COVER FOR THE MILK PAIL OF A MILKING MACHINE
Sven-Ake, Nordegren, Sodertalje, Sweden, assignor to Aktiebolaget Separator, Stockholm, Sweden, a corporation of Sweden
Filed Jan. 15, 1962, Ser. No. 166,128
Claims priority, application Sweden Jan. 18, 1961
4 Claims. (Cl. 119—14.46)

The invention relates to operating covers for the milk pail of a milking machine, which are made in one piece of a preferably die-cast material, e.g. of plastic, and consist of a cover proper which, at the upper side is fitted with an arched handle, a housing for a vacuum valve and two nipples, one of which discharges in the housing and the other one discharges inside the pail, at the underside of the cover, whereat the handle is, straight above the housing, provided with a device for clamping a pulsator between the handle and the housing, and the handle, moreover, is possibly provided with a hook for hanging up the teat cups with tubes and fittings and which, at the underside, is provided, on the one hand with a ring-shaped flange to be plugged into the neck of the pail and, on the other hand with a splash-screen.

The hitherto known operating covers of the type mentioned in the introduction have proved to be less suitable independently of whether they have been manufactured by a casting or pressing process or whether they were made of metal or of a synthetic material such as plastic or the like or whether they were made of a heavy or a light material.

According to the present invention an operating cover has been designed, which is more appropriate than the ones known hitherto with regard to the parts included in the cover, which parts have been designed in such a way that, besides cooperating with each other in a more advantageous way than hitherto for the fulfillment of their purposes, they also allow to manufacture the covers according to simplified and cheaper methods whereat the manufacture has been particularly focused upon the possibility of, by die-casting making the covers of plastic or similar materials which are light and cheap and which, from the hygienic viewpoint, are to be preferred within the food-stuff industry. As far as its construction is concerned the operating cover presents, with regard to its components, the same advantages even when it is produced by a casting process and in other materials.

The operating cover according to the invention is essentially characterized in that it is, on the upper side, provided with a bulge which forms a corresponding recess in the underside of the cover, that the nipple which discharges inside the milk pail opens out in said recess and that the recess and the nipple are arranged in such a way that a jet of milk fed in through the nipple comes tangentially into the pail without the jet striking any part on the underside of the cover and, in making so, passes through a boundary surface of the recess, which surface is essentially perpendicular to the longitudinal direction of the nipple, that the splash screen has the shape of a ring-shaped flange directed downwards and located right in front of the valve housing, that a hole in the cover constitutes a direct communication between the space inside the splash screen flange and the space inside the valve housing, that both nipples are located in vertical planes which are essentially parallel to each other, that they are directed obliquely upwards in opposite direction and that said vertical planes are essentially perpendicular to a vertical plane through the handle. According to a special embodiment, the bulge and the recess as well as the valve housing and the splash screen are located underneath the handle and nearer one of its ends than the other one. The nipples are preferably making an angle of less than 30° with the plane and the cover.

The advantage obtained with these structural parts which cooperate with each other is that the milk jet, owing to the fact that it is fed tangentially from above into the pail, hits the milk surface in the pail in such a way that splashes and foaming are avoided as much as possible. This is important in order to avoid the milk from being aspirated through the hole leading to the valve housing and destroying the vacuum plant. For the same reason the nipple for the milk opens out in a bulge, respectively a recess, in the cover, the shape of which is such that the milk jet cannot hit the walls limiting the recess and is discharged through a boundary surface of the recess which is perpendicular or essentially perpendicular to the longitudinal direction of the nipple, whereby no part of the milk jet can follow this boundary surface. In the contrary case the milk could follow the underside of the cover into the hole leading to the vacuum-valve housing and be aspirated into the vacuum system. The ring-shaped flange which is directed downwards and arranged around the hole leading to the valve housing, is also intended to prevent the milk from coming into the vacuum system, whether this is due to splashes, foaming or because the milk follows the underside of the cover.

To the above-mentioned advantages are added further advantages which are related to the manufacture of the cover whether this is done by means of a casting or a die-casting process. In the case of casting, the pattern has to have such a shape that it can be easily removed from the molding sand and the parts of the mold can be easily removed from the cast cover and, in the case of die-casting, the parts of the die must be easily removable from the die-cast object. According to the invention this is possible owing to the fact that the nipples are placed in such a way that they are directed upwards in opposite directions and located in parallel vertical planes which, in their turn, are perpendicular to a vertical plane through the handle. The inclination of the nipple, which make an angle of less than 30° with the plane of the cover has the advantage that the jet causes a minimum of splashing and foaming. Finally, the location of the bulge and of the recess as well as that of the valve housing and the splash screen under the handle, nearer one of its ends than the other one, has the advantage that the tubes which are to be collected to the nipples are not impeding the up- and down-folding of the carrying handle fitted on the pail, which handle is folded up against the carrying handle of the cover in order to press the cover against the pail when in operating position.

Figure 2:
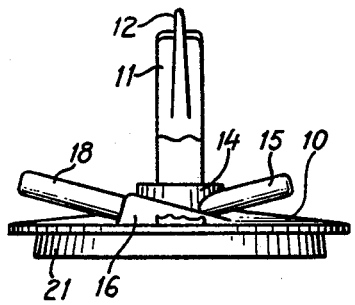
Figure 3:
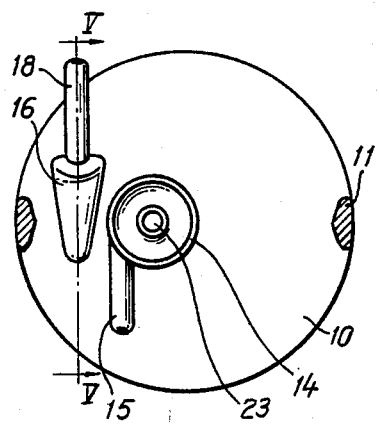
Figure 4:
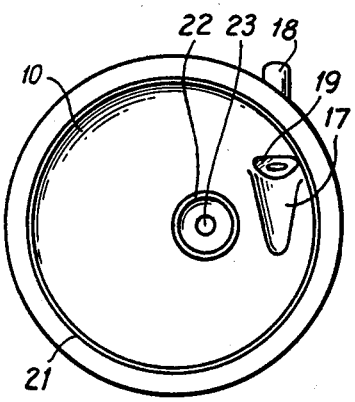
Figure 5:
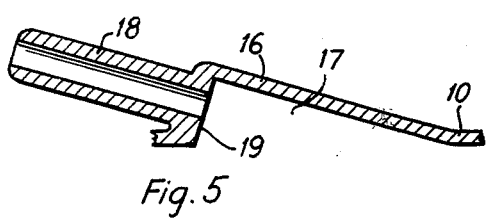

An operating cover for a pail according to the invention is shown in one of its embodiments in the attached drawing in which FIG. 1 is a side-view, partly sectional of the cover, FIG. 2 a view of the cover in FIG. 1 seen from the left-hand side, FIG. 3 a view of the cover in FIG. 1 seen from above with the handle removed, FIG. 4 a view of the cover as seen from below, and FIG. 5 a view on a larger scale of the milk nipple in FIG. 3 sectioned along the line V—V.

On the drawing, reference numeral 10 designates the cover proper which, on its upper side is provided with the arched handle 11 which, on the one hand is provided with a hook 12 for hanging up the teat cups with their tubes and other fittings, all of which are not shown on the drawing, and on the one hand with a device 13 in shape of a screw for clamping a pulsator, which is not shown on the drawing, between said screw and the valve housing 14. The housing 14 constitutes a valve housing for a vacuum valve adapted between the pulsator and the cover. The valve housing 14 is provided with a nipple 15 which discharges into the valve housing and is intended to be connected to a vacuum source by means of a tube. On the upper side of the cover is arranged a bulge 16 which corresponds to a recess 17 in the bottom side of the cover. A milk-conveying nipple 18 discharges into the recess 17. The boundary face surface 19 of the recess is essentially perpendicular to the longitudinal direction of the nipple 18. The handle 11 is provided with the usual stop 20 for a purpose which will be apparent to those skilled in the art.

On the underside of the cover is arranged a ring-shaped flange 21 directed downwards, which is intended to be introduced in the neck of a conventional milk pail. Inside this flange 21 and straight in front of the valve housing 14 is arranged another ring-shaped flange 22, directed downwards, which serves as a splash screen in order to prevent splashes and foam as well as milk which is possibly running along the underside of the cover from being aspirated in the vacuum system through the hole 23 which connects the space inside the flange 22, and thereby the inside of the milk pail, with the space inside the valve housing 14.

As it appears from the figures, the bulge 16 and the recess 17 as well as the valve housing 14 and the splash screen 22 are arranged below the handle 11 and nearer its left-hand end than its right-hand end in FIG. 1. The nipple 15 is preferably located between the centre of the valve housing 14 and that of the bulge 16. From FIG. 2 it further appears that the nipples 15 and 18 are making angles of less than 30° with the plane of the cover.

I claim:

1. In a milking machine, a pail cover made in one piece and including a cover member having at its upper side an arched handle spanning the cover member, the cover member also having at its upper side two nipples and a housing for a vacuum valve, the first nipple opening into the valve housing and the second nipple opening through the underside of the cover member and adapted to communicate with the pail, a clamping device mounted on the handle and located thereon above the valve housing for clamping a pulsator between the handle and said housing, the cover member at its underside having a ring-shaped flange adapted to closely engage the pail and also having a splash screen for the valve housing, the cover member having at its upper side a bulge which forms a corresponding recess in the underside of the cover member, the second nipple opening into said recess and extending generally tangentially to the periphery of the cover, said second nipple and the recess being adapted to allow a jet of milk to enter the pail tangentially to its periphery without the jet striking any part of said underside, the second nipple opening into the recess at a boundary surface which is generally perpendicular to the longitudinal direction of the nipple, the cover member having a hole therethrough opening into the valve housing, the splash screen being a ring-shaped flange directed downward from said underside and surrounding the hole, said nipples being generally parallel to each other and being directed obliquely upward in opposite directions, said nipples extending generally transversely of the handle.

2. A pail cover according to claim 1, in which the bulge and the recess as well as the valve housing and the splash screen are located below the handle and nearer one of its ends than the other one.

3. A pail cover according to claim 1, in which the bulge and the recess as well as the valve housing and the splash screen are located below the handle and nearer one of its ends than the other one and the first nipple is located between the centre of the valve housing and that of the recess.

4. A pail cover according to claim 1, in which the nipples are making an angle of less than 30° with the plane of the cover.

References Cited in the file of this patent

UNITED STATES PATENTS

| | | |
|---|---|---|
| 1,972,144 | Hapgood | Sept. 4, 1934 |
| 2,460,049 | Weiby | Jan. 25, 1949 |
| 2,610,609 | Thomas | Sept. 16, 1952 |
| 2,735,399 | Henrard | Feb. 21, 1956 |
| 2,809,607 | Golay | Oct. 15, 1957 |

FOREIGN PATENTS

| | | |
|---|---|---|
| 92,690 | Netherlands | Nov. 16, 1959 |